United States Patent [19]

Friend et al.

[11] Patent Number: 4,920,339

[45] Date of Patent: Apr. 24, 1990

[54] SWITCHABLE BUS TERMINATION AND ADDRESS SELECTOR

[75] Inventors: Robert C. Friend, Laguna Niguel; Charles R. Patton, III, Long Beach, both of Calif.

[73] Assignee: Western Digital Corp., Irvine, Calif.

[21] Appl. No.: 295,070

[22] Filed: Jan. 6, 1989

[51] Int. Cl.⁵ .............................................. H04J 3/02
[52] U.S. Cl. .................. 340/825.520; 340/825; 340/825.53; 370/85.1
[58] Field of Search ................ 307/443; 370/13, 85; 375/7; 340/825.03, 825.05, 825.06, 825.07, 825.08, 825.5, 825.52, 825.53, 825.69, 825, 310 R, 310 A; 364/200 MS File, 900 MS File

[56] References Cited

U.S. PATENT DOCUMENTS

| | | | |
|---|---|---|---|
| 4,200,862 | 4/1980 | Campbell et al. | 340/310 A |
| 4,604,618 | 8/1986 | Akiba et al. | 340/825.07 |
| 4,628,315 | 12/1986 | Douglas | 340/825.52 |
| 4,674,085 | 6/1987 | Aranguren et al. | 370/85 |
| 4,682,325 | 7/1987 | Heys, Jr. et al. | 370/85 |
| 4,800,384 | 1/1989 | Snijders | 340/825.05 |

Primary Examiner—Donald J. Yusko
Assistant Examiner—E. O. Pudpud
Attorney, Agent, or Firm—Christie, Parker & Hale

[57] ABSTRACT

A switchable termination module for use with addressable devices on a communication bus has a terminator for each signal transmission path, a signal source, for example a switch for signalling whether termination is desired and a terminator control circuit for engaging and disengaging the terminators in response to the signal from the signal source. The control circuit has a transistor between the source of potential and the terminators to couple the terminators to the transmission paths when termination is desired. The switch which signals whether termination is desired may also be used to select the address for the device.

16 Claims, 1 Drawing Sheet

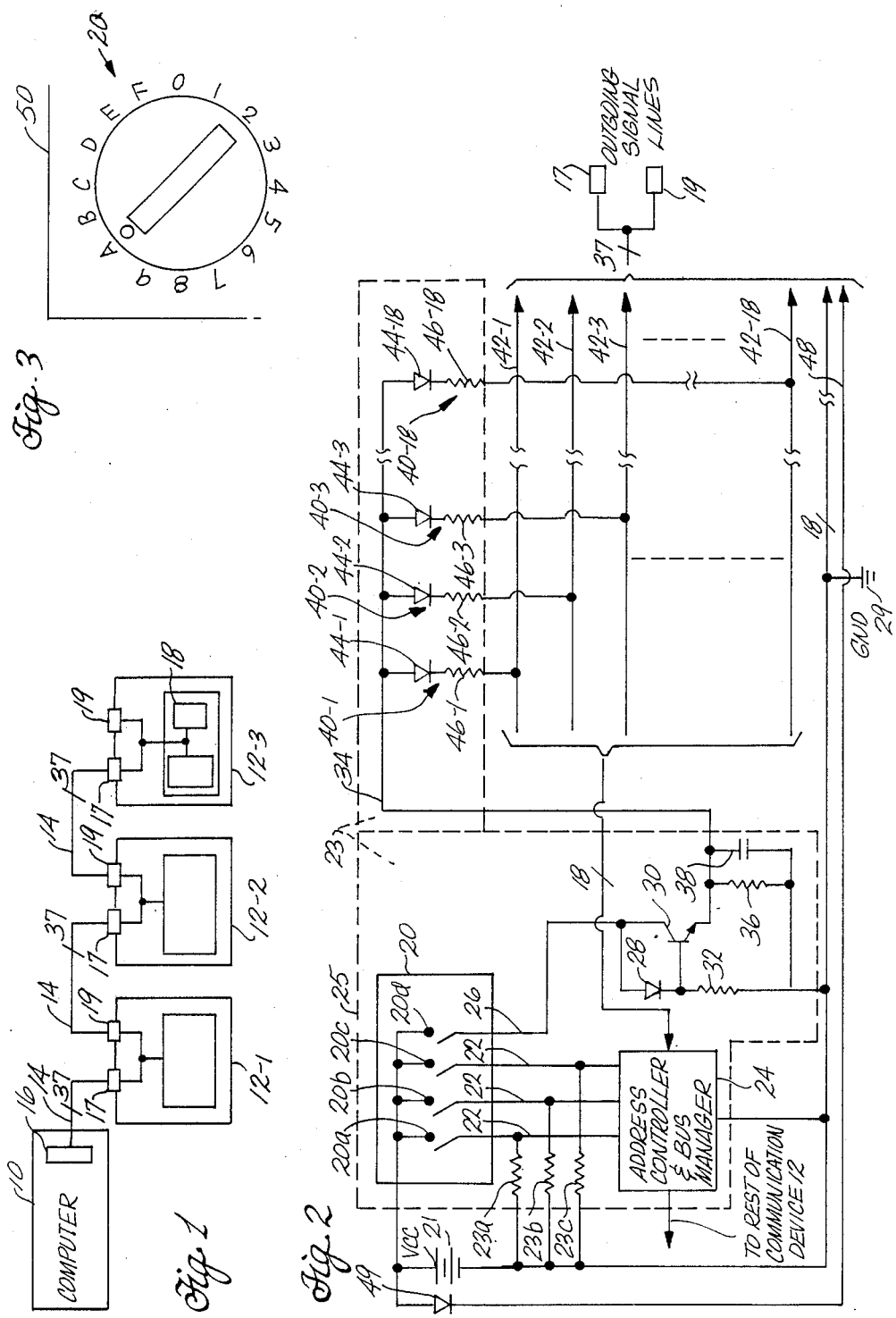

SWITCHABLE BUS TERMINATION AND ADDRESS SELECTOR

FIELD OF THE INVENTION

This invention pertains to terminating signal lines in a network of signal communication devices and, more particularly, to an apparatus for both selecting an address for a signal processing device and for terminating signal lines interconnecting the communication devices.

BACKGROUND OF THE INVENTION

Signal communication devices, for example, microcomputers, printers and disc or tape drives often are connected in daisy chain, star or other architectures. Normally, each device has two ports and is connected to other devices using twisted pair wire. The devices communicate electronic signals to each other over the wires. The wires are terminated with resistors at the first and last device in the network. The resistors are selected according to the characteristic impedances of the wires and usually connect the signal lines to a source of power or to ground. Each signal line and its corresponding return path (source of potential or ground) form a transmission path, typically in a single twisted pair wire. The terminating impedance is coupled between the wires across the signal path. The resistors are usually either provided within each device or added externally at both ends of the chain. Two different approaches are commonly used.

The simplest approach is to plug a cable adaptor containing terminating resistors for each wire into the unused port of the end device. When the end device is removed from the chain or moved to a different place on the chain, then the cable adaptor must be removed from the moved device and connected to the unused port of the new end device.

The second approach has been to include a removable package of terminating resistors in a socket on the printed circuit (PC) board of the device. By removing an access panel on the device, the package can be reached and manually pulled off or pushed into the socket on the PC board depending upon the location of the device on the chain.

These two approaches have the drawback that the resistors are in a separate unit which must be manipulated and stored independently of the device. In addition, the cable adaptor is generally packaged, sold and shipped separately from the devices which greatly increases its cost. The removable resistor package requires the device user to open up an access panel on the device housing and locate the correct package on the PC board. Many users are reluctant to open up housings and remove packages from the PC board.

A third approach is to intercept all signals on the bus and then regenerate and retransmit them with appropriate impedances so that the terminators are coupled to the bus whenever the device is active and receiving signals. The StarLink products made by Western Digital, product numbers 8000SH, 8000SH2 and 80003SH, for example, use this approach. This avoids the separate package of resistors and frees the user from manipulating resistors by hand, but the circuitry required is complex and expensive.

In some daisy chain systems such as the Small Computer System Interface (SCSI) bus system currently used, for example, in products of Apple Computer Inc., each device is addressable for communication purposes, and each device is assigned an address. The address for each device is usually assigned by setting a rotary switch on the exterior of the device to the desired address, or by removing and installing jumpers on the PC board through an access panel. Devices in the chain can find out the address of their neighbors by using standardized interrogation protocols. In these systems installation is complicated further because the user, when configuring his system, must select addresses for the devices as well as install or remove the terminating resistors.

SUMMARY OF THE INVENTION

The present invention allows a user to set the address and terminating status of a device on a communication bus using a single switch, thereby avoiding the added cost and complexity of access doors, package sockets and separate components.

In one embodiment, the present invention is a switchable termination module for a communication bus having at least one transmission path. The module comprises a port which connects to the communication bus, a terminator for each signal line, a signal source for signalling whether termination is desired, and a terminator control circuit for engaging and disengaging the terminators in response to the signal from the signal source.

In a preferred embodiment, the signal source is a rotary switch. The control circuit uses a transistor connected to the switch so that when the switch is engaged the transistor supplies a voltage potential. The terminators coupled through the control circuit to the source of potential comprise a resistive element including a diode and a resistor. When the switch is associated with a specific device it may also determine the address of that device.

BRIEF DESCRIPTION OF THE DRAWINGS

FIG. 1 is a block diagram of signal processing devices connected in a daisy chain by a bus which requires termination at each end of the chain, which termination may be provided using an embodiment of the present invention;

FIG. 2 is a circuit diagram of a portion of the block diagram of FIG. 1 showing a circuit for implementing the address and terminating impedance selector of the present invention; and FIG. 3 is a sketch of a rotary switch for use in the address and terminating impedance selector of FIG. 2.

DETAILED DESCRIPTION OF THE INVENTION

The present embodiment is particularly adapted for compatibility with the American National Standard for Information Systems (ANSI), SCSI specification No. X3.131-1986 (approved June 23, 1986), commonly used, for example, in the microcomputer products of Apple Computer Inc. However, the invention may be applied to many other communication buses.

FIG. 1 shows a communication device or microcomputer 10, for example, an Apple Macintosh TM Microcomputer connected to three communication devices or peripherals 12-1 to 12-3. The peripherals may be any of a number of signal communication devices including printers, disc drives, compact disc readers or other computers, along with controllers for the communication of signals. Bus 14 connects the microcomputer 10 to the peripherals 12, in this case in a daisy chain. The bus 14 has eighteen parallel signal transmission paths. Each signal transmission path has an active signal line side and is associated with a return path or ground line. There is also a terminator power line, so that 37 wires in total make up the bus cable. Each signal lead, with its ground lead, forms a separate transmission path for signals between the communication devices. Normally, each signal line wire is in a twisted pair with its corresponding return path. This 37 wire system is a variation on ANSI, SCSI specification X3, 131-1986 which requires fifty paired wires, most of which are ground lines. Apple's 37 wire system reduces the number of leads with no loss of function. However, the present invention may be used with many other signal transmission paths and not just SCSI or Apple SCSI networks.

The 36 paired wires of the communication bus 14 carry addresses and data signals from one device to another. Each device has two ports, a first port 17 and a second port 19 to which the communication bus 14 is connected. Since all devices are effectively connected in parallel, each device identifies itself using an address. In the SCSI bus standard there are nine data lines, nine arbitration and control lines, at least eighteen ground lines and a terminator power line. Standardized SCSI protocols allow eight different addresses to be transmitted over the data lines to insure that each device communicates with only the intended device.

The SCSI bus is an open collector bus and all active wires are normally high at or near 3.3 volts. This is considered a false. A grounded signal wire is a true. A typical protocol is as follows. Assume a host communication device, with address seven, wants to transmit a data word to a disk drive communication device with address zero. To select the disk drive, the host device first grounds or asserts the signal wires for select (SEL), data seven (DB7, its address) and data zero (DB0, the disk's address). The disk device responds by grounding or asserting the busy line (BSY). The host device deasserts select, data seven and data zero and the disk device asserts the command/data (C/D) line and request line (REQ), requesting the first command byte. The host device then transmits the data word over the nine data lines (DB0-DB7,DBP) with an acknowledge (ACK) signal. These and other protocols are more thoroughly described for the SCSI bus by ANSI Specification No. X3.131-1986, referred to above. The invention, however, is not limited to any one type of bus or protocol.

Both ends of each transmission path of the daisy chain are terminated in the characteristic impedance of the respective transmission path, thus minimizing reflections and ringing of the signals on the lines.

Preferably, in accordance with the present invention, each communication device in the system has an address and terminating impedance selector. This device is used to both select and set the desired address of the device and couple or uncouple terminating impedances across the signal path connected to the device. In practice, it may not be necessary to have a selector present in each device, when a device will never be placed at the end of the bus. Microcomputers are normally placed at the end of the bus and usually already include an internal terminator. By way of example only, in FIG. 1 the microcomputer 10 and the peripheral 12-3 are shown with address and impedance selectors 16 and 18, it being understood that there may also be a selector in any of the other devices of FIG. 1.

FIG. 2 shows a schematic diagram of an address and terminating impedance selector for one of the devices 12 of FIG. 1, along with an address controller and bus manager, and the 36 lines of the 18 transmission paths used in bus 14 of FIG. 1. The terminator power line 48 connects to a power supply 21 on the device through a diode 49, to insure a high potential on the line but to prevent the power line from upsetting the power supply. Some devices use the power line 48 to power the resistive terminator on the bus 14 as described in the background.

Each address and terminating impedance selector is preferably integrated into each device on the communication bus. However the selector could also be provided in a separate cable adapter. The address and terminating impedance selector includes a rotary switch 20 (FIGS. 2 and 3). The rotary switch 20 has sixteen positions or settings in two sets of eight, as shown in FIG. 3. The first set of positions is indicated by hexadecimal numbers 0 through 7 corresponding to a plurality of eight unique addresses. The second set of positions is indicated by hexidecimal numbers 8 through F. The addresses for positions 0-7 are identical to the addresses for positions 8-F, respectively. Each switch position 0-7 for the first set of eight addresses selects a different device address and couples the terminating impedances across the 18 transmission paths. Each of the second set of eight switch positions 8-F selects, for recognition, a different one of the same eight possible addresses but causes the terminating impedances to be uncoupled from the 18 transmission paths. The rotary switch 20 is preferably mounted on the exterior of a housing 50 of the corresponding device which contains the circuitry shown in FIG. 2 so it can be easily reached and operated by the user.

Other types of switches may be used with a different number of positions depending upon the maker's preferences and the requirements of the bus.

As shown in FIG. 2, the rotary switch 20 has three outgoing address selection lines 22 which connect to an address controller and bus manager 24 that is normally a part of the communication device and that meets the ANSI standards. The address controller and bus manager interprets the signals on the three lines 22 and causes the device on which the switch is mounted to only be responsive to, and to only use as its own address, the selected address, using techniques well known in the art. The thirty-six paired wires of the eighteen transmission paths connect to the address controller to transmit data to and from the device over the bus. Any SCSI bus address controller available on the open market may be used, for example, the SCSI Bus Interface Controller of Western Digital, Product No. 33C93.

Each of the settings of switch 20 causes a combination of settings of contacts 20a, 20b and 20c so as to represent the corresponding address. The contacts 20a, 20b, 20c are connected to the high side VCC of power supply 21. The low side or ground of the power supply 21 connects to the contacts 20a, 20b, 20c through pull-down resistors 23a, 23b, 23c. The low side of the power supply 21 is a common ground 29 for all of the parts shown in FIG. 2, including the return paths of the signal transmission paths. Thus, each of contacts 20a, 20b and 20c closes to connect the corresponding line controller 24 to VCC of the power supply 21 or to open to allow the pull down resistors 23a, 23b, 23c to ground the address select lines 22. Addresses in positions 8 through F that are the same modulo 8 as the ones in positions 0 through 7 have the same combination of signals on lines 22.

The rotary switch 20 is part of a switching circuit 25 which selects the addresses and either couples or uncouples the terminating impedance across the signal paths. The rest of the switching circuit 25 will now be described. The rotary switch 20 has a termination contact 20d connected to the high side VCC of the power supply 21. The other side of the termination contact 20 is connected to a terminator control line 26 (FIG. 2), which, in turn, is connected to the anode of a diode 28 and the collector of a transistor 30. The transistor 30 serves as a switching circuit and a controlled voltage source for the terminators 40-1 to 40-18 as described below. The cathode of the diode 28 is connected to the base of the transistor 30 and, through a pulldown resistor 32, to the low side of power supply 21, the circuit's common ground 29. The diode 28 and the resistor 32 form a voltage divider for the base of the transistor 30. In the present embodiment the voltage drop of diode 28 and resistor 32 are preferably chosen to give 4.4 volts to the base of the transistor 30 and thereby 3.8 volts to the emitter of the transistor. The emitter of the transistor 30 is connected through a resistor 36 to the ground 29, and to a capacitor 38, the other side of which is grounded 29. The emitter is also connected to a bridge 34 of terminators 40-1 to 40-18. The resistor 36 and capacitor 38 smooth out surges and spikes from the termination bridge 34.

Each terminator has two elements in series, namely, one of diodes 44-1 to 44-18 and one of resistors 46-1 to 46-18. The anode of each diode 44-1 to 44-18 is connected in parallel to the emitter of the transistor 30 and the cathode of each diode 44-1 to 44-18 is connected through its respective resistor 46-1 to 46-18 to a different one of the active leads 42-1 to 42-18 on the SCSI bus 14. The diodes 44-1 to 44-18 serve as unidirectional switches to couple and uncouple the resistors 46-1 to 46-18 from the leads 42-1 to 42-18.

The components between the terminator control line 26 and the bridge 34 of terminators 40-1 to 40-18 comprise a terminator control circuit which provides the proper termination voltage for the terminators 42-1 to 42-18 of the bridge.

There is one terminator for each of the eighteen active leads of the signal lines 42-1 to 42-18 of the SCSI bus. The active leads 42-1 to 42-18 connect the termination module through the first and second port 17, 19. The eighteen return paths of the bus 14 connect to a ground 29 which is common with the ground side of the power supply 21.

In operation, the user selects one of the sixteen possible positions of the rotary switch 20. This selected position controls the state of the address selection lines 22 and of the terminator control line 26. The address selection lines 22 determine the address that the address controller and bus terminator 24, and hence the corresponding communication device, will respond to and use. If the user has selected one of settings 8 through F with switch 20 for no termination, then the terminator control line 26 is open. Therefore, there will be no current through transistor 30, and resistor 36 will pull the bridge line 34 to ground so that the signals on lines 42-1 to 42-18 reverse bias the diodes 44-1 to 44-18. These diodes then provide a high impedance path between their cathodes and anodes. As a result, terminating resistors 46 are uncoupled from across their corresponding signal or transmission paths, that is from the signal lines 42-1 to 42-18 to ground.

If the user has selected termination with switch 20, i.e., one of address positions 0 through 7 shown in FIG. 3, then contacts 20d of switch 20 will connect control line 26 to the VCC source of power from power supply 21 which is high and typically at +5 volts. The control line 26 supplies current to the collector of the transistor 30 and also, through the voltage divider made up of diode 28 and the resistor 32, to the base of the transistor 30 causing the emitter of transistor 30 to be at +3.8 volts.

The standard for terminating a signal path of a SCSI bus requires 220 ohms from the signal line of the signal path to a +5 volt power supply and 330 ohms from the signal line to ground. This is the Thevenin equivalent to a 132-ohm termination resistor connected to a 3V source. In the present exemplary embodiment, the resistors 46 are each chosen to equal that Thevenin equivalent. The diodes 44-1 to 44-18 have a drop of 0.7 V from 3.8 V at the anodes to 3.1 V at the cathodes which is within five percent of the nominal termination voltage of 3 V. The dynamic resistance of the forward biased diodes 44-1 to 44-18 is much less than the 132 ohms, so the series combination of resistors 46-1 to 46-18 and diodes 44-1 to 44-18 is effectively equal to the resistors 46-1 to 46-18 alone. The termination resistors 46-1 to 46-18 provide matching terminations to each of the corresponding one of the signal lines 42-1 to 42-18. The 18 return paths are coupled to the ground side of the power supply 21. This is then the Thevenin equivalent of the SCSI bus termination standard.

The signal line side 42-1 to 42-18 of each transmission path will either be at 3V or zero volts in the SCSI standard. When the transistor 30 is powered, the disconnect diodes 44-1 to 44-18 are forward biased since the anodes are always at a higher potential, 3.8 V, than the cathode, which will be at either 3 V or zero volts, depending on the state of the signal line. The direct current (DC) component of the signal therefore has a low impedance path through the transistor 30 used as an emitter follower, and power supply circuit 21 to ground 29. The alternating current (AC) component has a low impedance path through the capacitor 38 to ground 29.

Again, turning off the power supply 21 to the transistor 30 by disconnecting contact 20d through the rotary switch 20 turns off the 3.8 V supply to the disconnect diodes 44-1 to 44-18. Resistor 36 through the bridge 34 reverse biases diodes 44-1 to 44-18, creating a high impedance path and effectively cutting off the termination resistors 46-1 to 46-18 from the signal lines 42-1 to 42-18. By adjusting the voltage of the emitter follower transistor 30 and the resistance of terminators 40-1 to 40-18, different termination standards can be accommodated using the same basic circuitry.

Many modifications to the present invention are possible without departing from the spirit and scope of the present invention.

The present invention may also be adapted for buses other than the SCSI bus and for architectures other than a daisy chain architecture. The number of signal lines and terminators may be varied as well as the nature of the termination to match these different buses. Other modifications may also be made. It is not intended by describing only one exemplary embodiment to limit the invention to that one embodiment.

What is claimed is:

1. In a communication network having a plurality of devices for communication therebetween over at least one transmission path coupling the devices together, at least one said device being addressable and responsive to a selected address for communication, a switchable termination module associated with said at least one addressable device, the module comprising:
   a port for connection to the at least one transmission path;
   a controllable terminator for the at least one transmission path connected to the port; and
   a switch having a first set of switch conditions for enabling the terminator to terminate the transmission path and for simultaneously selecting one of a plurality of addresses to which the at least one device responds, and a second set of switch conditions for disabling the terminations of the terminator and for simultaneously selecting any one of a plurality of addresses for the at least one device.

2. The module of claim 1 also comprising a terminator control circuit for enabling and disabling termination of the terminator on the transmission path depending on the switch condition of the switch.

3. The module of claim 2 wherein the terminator comprises a resistive element for coupling a source of potential to the at least one transmission path.

4. The module of claim 3 further comprising a diode for disconnecting the resistive element from the transmission path.

5. The module of claim 3 wherein the control circuit comprises a transistor between the resistive element and the source of potential, which is in electric communication with the switch for selectively coupling the resistive element to the source of potential.

6. The module of claim 1 wherein the switch comprises a rotary switch.

7. The module of claim 1 wherein the switch is accessible for operation by a person.

8. The module of claim 3 further comprising a unidirectional switch in series with the resistive element.

9. In a network of signal communication devices capable of signal communication with each other over signal transmission paths, where each path comprises a signal line side and a return path side for signals, where at least one of such communication devices comprises a controller responsive to an address and a terminating impedance selector, for recognition of a selected address received over at least one of the transmission paths for effecting such signal communication, the address and terminating impedance selector comprising:
   a plurality of terminating impedances, at least one of said terminating impedances corresponding to each such transmission path for terminating the corresponding transmission path substantially in its characteristic impedance;
   a switching circuit comprising a controllable switch having a first plurality of settings, each setting enabling the switching circuit to couple each said terminating impedance between the sides of the corresponding transmission path, and each said setting enabling such controller to select a different one of a plurality of addresses for recognition by the controller; and
   the controllable switch having a second different plurality of settings, each said second setting enabling said controller to select, without coupling of the terminating impedances between the transmission paths by the switching circuit, a different one of the same said plurality of addresses for recognition.

10. The selector of claim 9 further comprising a unidirectional switch coupled to each terminating impedance and responsive to the controllable switch for disabling the terminating impedance from terminating the associated signal line.

11. The selector of claim 10 wherein the unidirectional switch comprises a diode.

12. The selector of claim 9 wherein each transmission path is coupled through the associated terminating impedance to a source of potential.

13. The selector of claim 9 further comprising a unidirectional switch connected in a series circuit with each said terminating impedance for blocking cross talk between signal lines.

14. The selector of claim 13 wherein the unidirectional switch comprises a diode.

15. A selector according to claim 10, comprising a further switching circuit responsive to a first condition of the first switching circuit for allowing the unidirectional switches to uncouple the terminating impedances from between the sides of the corresponding signal paths, and being responsive to a second condition of the first switching circuit for enabling the unidirectional switches to couple the terminating impedances between the sides of the corresponding signal paths.

16. The selector of claim 15 wherein the further switching circuit comprises a transistor.

* * * * *

UNITED STATES PATENT AND TRADEMARK OFFICE
CERTIFICATE OF CORRECTION

PATENT NO. : 4,920,339
DATED : April 24, 1990
INVENTOR(S) : Robert C. Friend; Charles R. Patton, III It is certified that error appears in the above-identified patent and that said Letters Patent is hereby corrected as shown below:

Column 2, line 9, change "his" to -- this --.
Column 2, line 56, change "specification" to
    -- Specification --.

Column 3, line 11, change "specification to
    -- Specification --.
Column 3, line 27, change "insure" to -- ensure --.

Column 4, line 7, change "insure" to -- ensure --.
Column 4, line 15, change "adapter" to -- adaptor --.
Column 4, line 22, change "hexidecimal" to
    -- hexadecimal --.
Column 4, line 42, change "device" to -- devices --.

Column 5, line 27, change "grounded" to -- ground --.

Signed and Sealed this

Tenth Day of November, 1992

*Attest:*

DOUGLAS B. COMER

*Attesting Officer*    Acting Commissioner of Patents and Trademarks